Dec. 25, 1956 L. C. BEARER 2,775,635
METHOD AND APPARATUS FOR HEATING FLUIDS
Filed Nov. 12, 1952 3 Sheets-Sheet 1

INVENTOR.
L. C. Bearer
BY Hudson & Young
ATTORNEYS

Dec. 25, 1956  L. C. BEARER  2,775,635
METHOD AND APPARATUS FOR HEATING FLUIDS
Filed Nov. 12, 1952  3 Sheets-Sheet 2

INVENTOR.
L. C. Bearer
BY
Hudson & Young
ATTORNEYS

Dec. 25, 1956   L. C. BEARER   2,775,635
METHOD AND APPARATUS FOR HEATING FLUIDS
Filed Nov. 12, 1952   3 Sheets-Sheet 3
*Fig. 5.*
*Fig. 5a.*
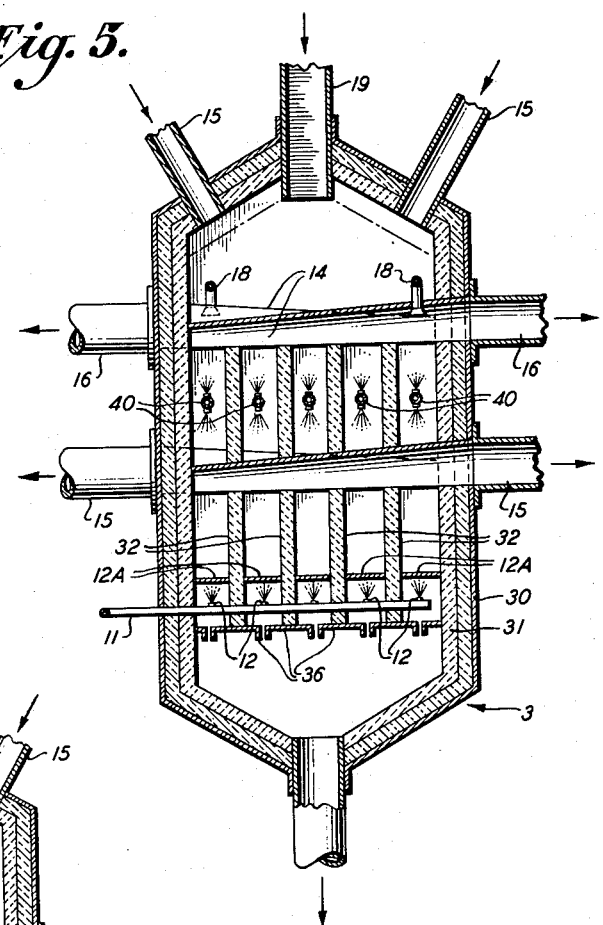
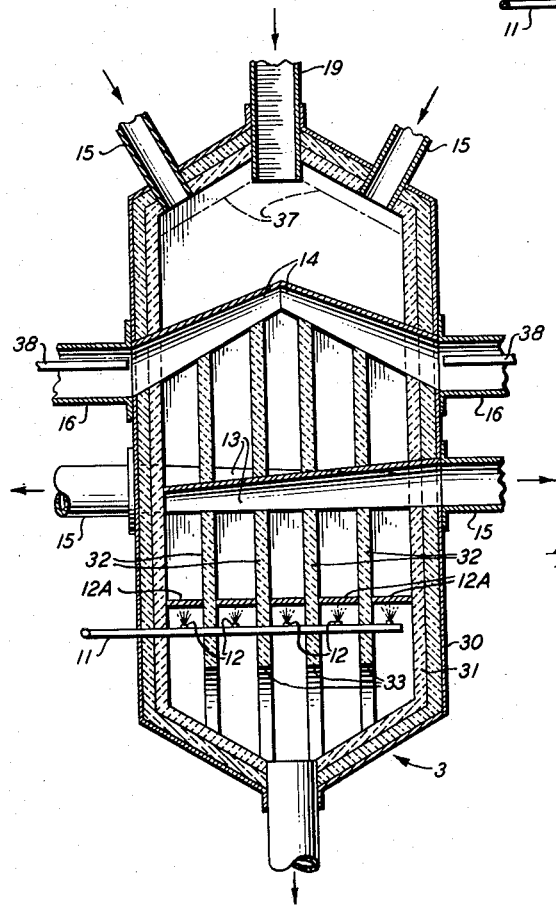
*Fig. 6.*
INVENTOR.
L. C. Bearer
BY
Hudson & Young
ATTORNEYS

United States Patent Office 2,775,635
Patented Dec. 25, 1956

2,775,635

METHOD AND APPARATUS FOR HEATING FLUIDS

Louis C. Bearer, McGregor, Tex., assignor to Phillips Petroleum Company, a corporation of Delaware Application November 12, 1952, Serial No. 319,990

14 Claims. (Cl. 260—679)

This invention relates to a process and apparatus for conducting high-temperature heating or reactions, such as the production of acetylene from ethane. In one aspect, it relates to the production of acetylene from ethane in two steps, namely (1) the conversion of ethane to ethylene and (2) the conversion of ethylene to acetylene. In another aspect, it relates to a method and apparatus for effecting a high degree of heat transfer in a short, controlled contact time. In another aspect it relates to a method and apparatus for imparting heat to particulate heat-exchange bodies and preheating air used for the combustion of fuel which is burned to impart heat to such bodies. In still another aspect, it relates to an improved pebble heater and reactor. In another aspect, it relates to a process and an apparatus for the heating of fluids.

Pebble heaters have been used for a number of years to effect high-temperature reactions of hydrocarbons. Although pebble heaters have been used for the production of acetylene from paraffinic hydrocarbons such as methane, ethane, and propane, one difficulty has been that of transferring large amounts of heat, at temperatures in the range 1800 to 2500° F., from pebbles to reactant hydrocarbons in the very short reaction times (.001 to 0.1 second) required for the conversion of such paraffinic hydrocarbons to acetylene.

Other problems in the high-temperature heating of gases by means of hot, particulate heat-transfer solid media arise from the difficulty of obtaining desirable heat economy and uniform flow of gases and solids.

According to this invention, a fluid is heated by countercurrent contact with a downwardly moving mass of heat-carrying particulate solids in a lower part of a gas heating zone, partially heated gas is disengaged from said solids in a lower intermediate part of said zone, the partially heated gas is then contacted non-countercurrently with said mass of solids, at a higher temperature, in an upper part of said zone, and heated product is withdrawn from an upper part of said zone. By this method, a high degree of heating efficiency is obtained and the final heating of the gas is effected at a high rate and at a short, readily controlled contact time.

According to one embodiment of the invention, a hydrocarbon gas, such as ethane, is countercurrently contacted with a heated mass of downwardly flowing refractory pebbles in a lower part of a reaction zone to produce mainly ethylene; the ethylene-containing product is disengaged from the pebbles in a lower intermediate part of said zone; the ethylene-containing gas is then non-countercurrently contacted with said mass of pebbles in an upper portion of said zone, at a high temperature and a short contact time, to convert the ethylene to acetylene; and the acetylene-containing product is disengaged from the pebble mass in an upper intermediate part of said zone and passed to acetylene recovery means.

Those skilled in the art will readily recognize that this embodiment of the invention effects the conversion of ethane to acetylene in two stages, namely ethane to ethylene and ethylene to acetylene, each stage being conducted at optimum temperature and reaction time. This is an improvement over prior art processes which convert ethane to acetylene in a single stage, since it effects the ethane-to-ethylene conversion and the ethylene-to-acetylene conversion at the optimum conditions for each and thus results in high yields of acetylene by avoiding undesired side reactions, such as coke and tar formation. Furthermore, by utilizing countercurrent flow for the ethylene-producing reaction and non-countercurrent flow for the acetylene-producing reaction, the optimum contact time for each reaction can be controlled and maintained. The optimum contact time for the acetylene-producing reaction is much shorter than that for the ethylene-producing reaction, and non-countercurrent flow of ethylene and pebbles is much more conducive to a high degree of heat transfer in a short time than is countercurrent flow.

Further in accordance with this invention, a high degree of heat economy in the heating of the particulate heat transfer medium is obtained, by passing said medium from the aforementioned gas-heating zone to a pebble-heating zone, countercurrently contacting said medium with air in an upper part of said pebble-heating zone to preheat the air, passing the preheated air, together with fuel gas, to a lower part of said pebble-heating zone and therein countercurrently contacting said medium with burning fuel gas to heat said medium, and withdrawing combustion gases from the pebble-heating zone at a locus below that of entry of the air to be preheated. The heated pebbles are then passed to the gas-heating zone previously mentioned.

Further, in accordance with this invention, there is provided in a pebble heater apparatus, a fluid heater comprising, in combination: a vertically disposed chamber; lower fluid introduction means positioned in a lower part of said chamber; fluid disengaging and removing means positioned in an intermediate part of said chamber; upper fluid introduction means positioned in an upper part of said chamber; conduit means in open communication with said upper fluid introduction means and said disengaging means; pebble introduction means positioned in an upper part of said chamber; and pebble withdrawal means positioned in a lower part of said chamber.

In one apparatus embodiment of the invention, there is provided a plurality of fluid disengaging means at different intermediate levels in the chamber, the lower of said disengaging and removing means being in open communication with the upper fluid introduction means.

In a further embodiment of the invention, there is provided, in a pebble heater reaction chamber, fluid disengaging means comprising elongated hoods positioned convex upwardly in open communication with conduit means for withdrawing fluid from, or introducing fluid into, the reactor. The cross section of the hoods may be arcuate or angular, e. g. semicircular, semi-elliptical, hyperbolic, parabolic, catenary, or angular-rectilinear. The diameter, or other cross-sectional dimension, can be increasing in the direction of the communicating conduit. The hood can be horizontally positioned in the chamber, or it can be positioned at an angle corresponding to the angle of repose of the pebble bed, or other suitable angle.

In a further apparatus embodiment of the invention, there is provided fluid inlet or quenching means within said hood or disengaging means. Thus, products withdrawn or introduced through the disengaging means can be immediately quenched, diluted, or mixed with other fluids.

A process for producing acetylene from ethane is illustrated diagrammatically in Figure 1. Refractory pebbles, heated to a temperature in the range 1800 to 2700° F., preferably 2000–2500° F., in pebble-heating chamber 2, gravitate through throat 19 into and through reaction chamber 3. Ethane enters chamber 3 through inlet 11 and distributing means 12. The ethane flows upwardly through section 10 and is quickly heated, by the gravitating pebbles, to an ethylene-forming temperature, i. e., 1400 to 1700° F., preferably 1500 to 1700° F. The temperature of the pebbles in section 10 is in the range 1400 to 2000° F., preferably 1600 to 1900° F. The reaction time in section 10 is in the range 0.02 to 2.0 seconds, preferably 0.05 to 1.0 second. Contacting of pebbles and hydrocarbon in section 10 is countercurrent.

Ethylene-containing product is removed from chamber 3 through disengaging means 13 and passed through conduits 15 to the upper part of chamber 3, i. e., section 8. Part of the product can be removed through outlets 15A and sent to ethylene recovery means, not shown.

In section 8, the ethylene-containing gas concurrently contacts heated pebbles and is converted to acetylene. Acetylene-containing product is withdrawn through disengaging means 14 and outlets 16 and passed to acetylene recovery means, not shown. The reaction temperature in section 8 is in the range 1800 to 2400° F., preferably 2000 to 2400° F. The reaction time is in the range 0.001 to 0.02 second, preferably 0.001 to 0.01 second. The product is rapidly quenched, with water, steam or other inert material introduced through quench inlet 17 and manifold 18, to a temperature below 1000° F. Inlet 17 and manifold 18 can be positioned inside means 14 if desired. In some cases, part of the ethylene stream withdrawn through outlet 15A can be cooled in cooler 42 and passed through lines 41 and 17 as quench gas. Furthermore, cool product gas containing acetylene can be used an the quench gas. When the acetylene is made for purposes of subsequent reaction with another reactant, said other reactant can be used as the quench fluid. When benzene is a desired product, suitable catalysts, known in the art, can be placed within disengaging means 14 and the acetylene condensed to benzene upon cooling to the proper temperature.

Pebbles from chamber 3 gravitate into elevator 4 and are returned to pebble-heating chamber 2. Air enters chamber 2 through inlet 25 and distributing means 26 and is preheated by countercurrent contact with pebbles, which enter chamber 2 at a temperature in the range 500 to 1000° F. Preheated air is withdrawn through manifold 27 and conduit 28. It is mixed with fuel gas in inlet 21 and passed to distributing means 22. In section 7, the burning fuel gas heats the pebbles to a temperature in the range 1800 to 2700° F. Combustion gases are withdrawn through disengaging means 23 (similar to means 13 and 14) and outlets 24 and passed to a stack, not shown.

In chamber 2, section 6 acts as a seal between sections 5 and 7.

As will be understood by those skilled in the art, means not shown, can be connected to lines 15 and 16 for maintaining the necessary suction for disengagement and removal of gases from pebbles. Also compressor means can be connected to line 15 for forcing withdrawn gas into section 8 of chamber 3. In many cases, such expedients are unnecessary, pressure drop across the entire apparatus ordinarily being sufficient to accomplish the desired result.

In chamber 3, section 9 acts as a seal between sections 8 and 10. The depth of section 8 is preferably in the range 0.5 to 3 feet, more preferably 1 to 2 feet. The depth of section 9 is preferably at least 50 percent greater than that of section 8, more preferably from 50 to 100 percent greater. The depth of section 10 is preferably at least twice that of section 8, more preferably from two to four times that of section 8. To aid in maintaining a seal between sections 8 and 10, a suitable inert fluid such as steam or nitrogen, can be injected through inlet 40 into sealing section 9.

A steam seal 20 can be provided in throat 19 to prevent intermixing of gases from chambers 2 and 3.

Another apparatus embodiment of the invention is shown in Figures 2, 3, and 4.

Figure 5 is an elevational view of chamber 3 (Figure 1).

Figure 1:
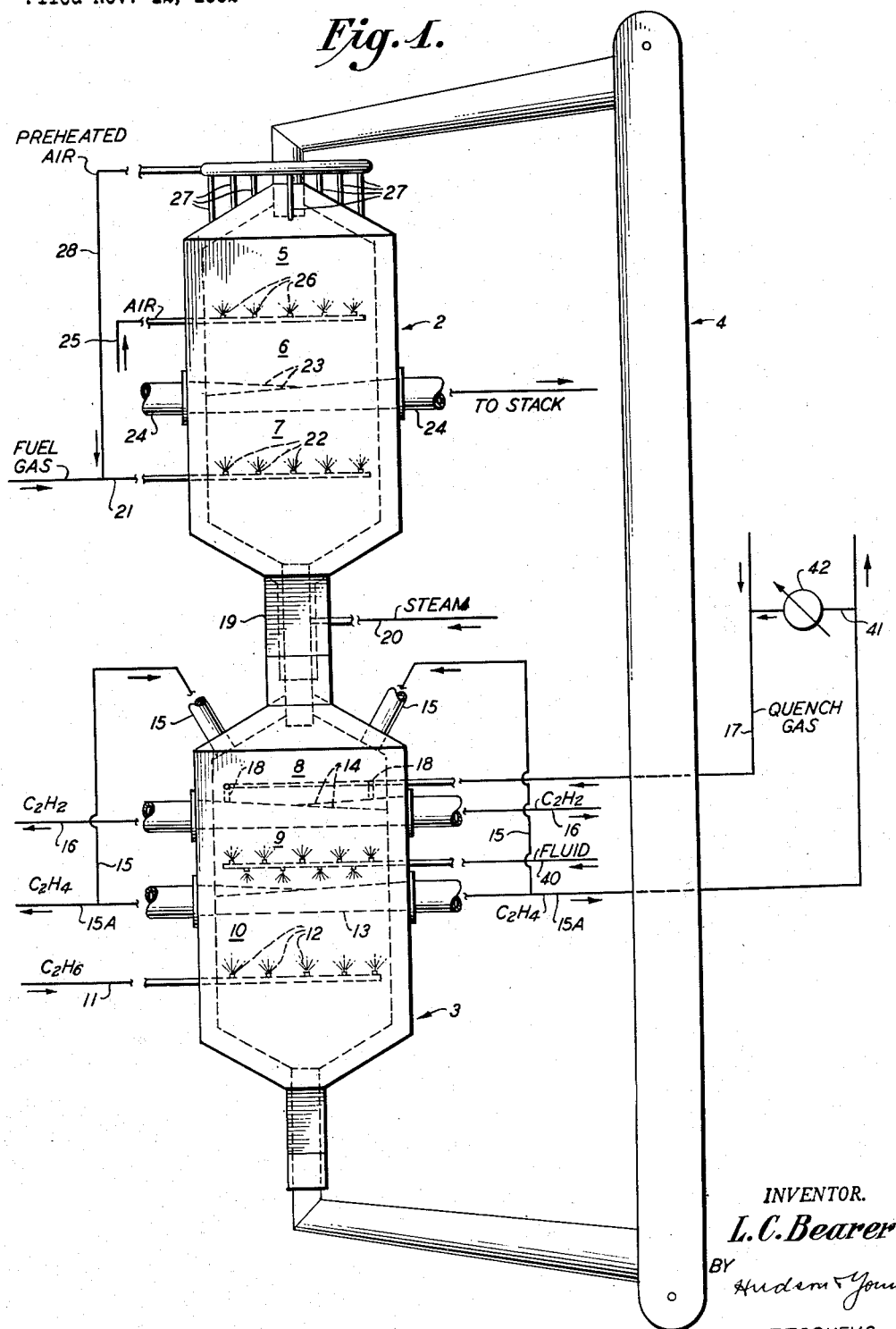

Chamber 3 comprises metal shell 30 and refractory lining 31, together with pebble throat 19 and a pebble outlet, at the bottom, leading to elevator 4 (Figure 1). Manifold inlet 11, with distributing jets 12, is positioned in the lower part of chamber 3. Refractory deflector means 12A, positioned above jets 12, aid in feed distribution and prevent channelling. Disengaging means 13 are hood-like members shown as half conic sections having semicircular cross section with maximum diameter at the point of junction with outlets 15. The shape and disposition of disengaging means 13 is such as to allow free flow of pebbles over said means. In the embodiment illustrated, a plurality of said disengaging means is provided and arranged for withdrawal of disengaged gases in opposite directions through alternate hoods and pipes. The hoods and the supports can be made of any suitable refractory of or temperature-resistant alloy.

Disengaging means 13 are supported on support members 32, which are vertically disposed and which extend across the interior of chamber 3. Openings 33 are provided in the lower part of supports 32 for flow of pebbles therethrough.

Inlet 34 and outlet 35 are positioned in the upper part of chamber 3.

Figure 2:
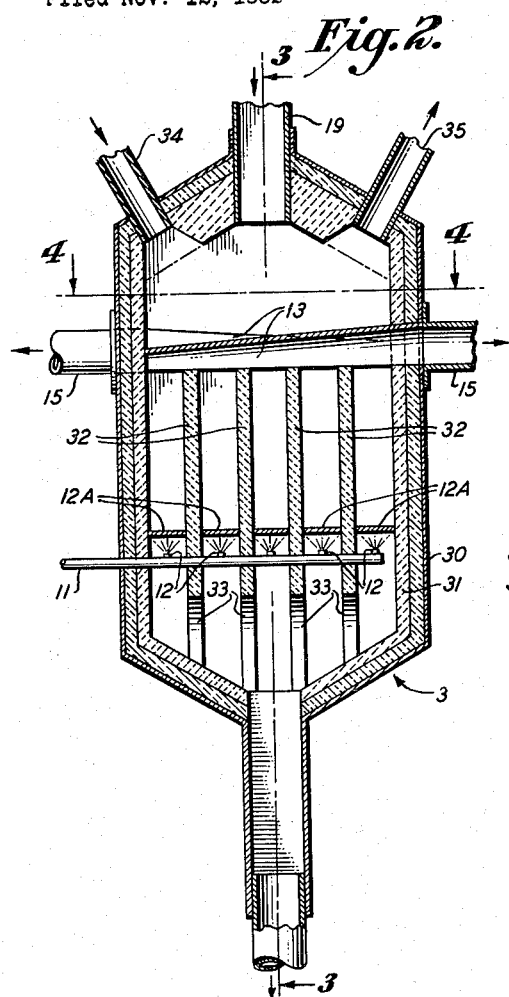
Figure 3:
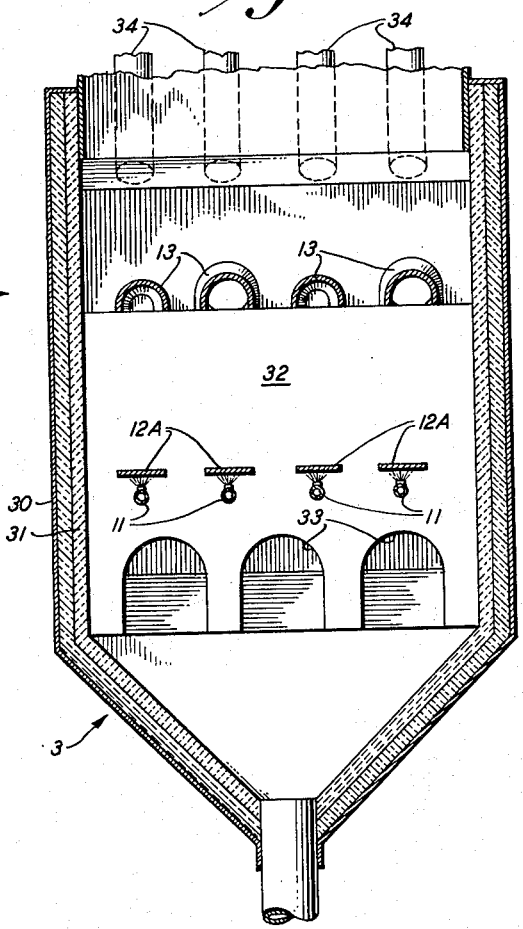
Figure 3 is an elevational view of chamber 3 taken along the line 3—3 in Figure 2.
Figure 4:
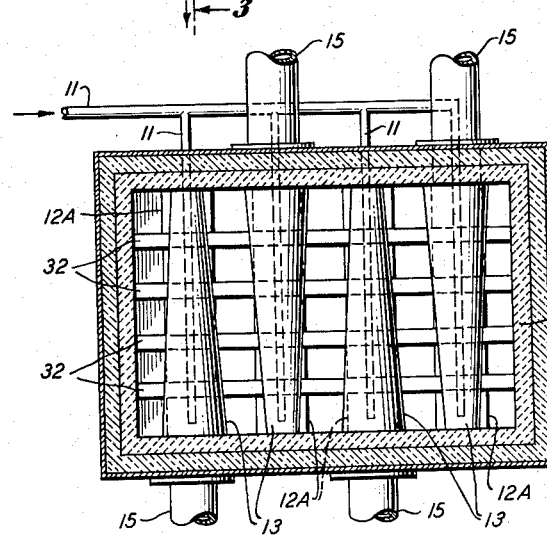
Figure 4 is a plan view taken along the line 4—4 in Figure 2.

In the modification shown in Figures 2, 3, and 4, preheated gas, which can contain ethylene, is withdrawn through disengaging means 13 and conduit 15 and passed to inlet 34, and contacts the pebble bed transversely. Product gas, e. g. acetylene, is withdrawn through outlet 35.

Figure 5 shows a further embodiment of the invention in which ethane can be converted to ethylene by countercurrent contact with pebbles in a lower part of chamber 3, the ethylene being removed through disengaging means 13 and conduits 15 and concurrently contacted with pebbles in an upper part of chamber 3, and product acetylene being withdrawn through outlets 16, all as described in connection with Figure 1.

In Figures 2 and 5, corresponding apparatus members are designated by the same reference numerals. Structurally, the apparatus of Figures 2 and 5 are alike, except that, in Figure 5, disengaging means 14 are provided in addition to and at a higher level in chamber 3 than disengaging means 13. The two sets of disengaging means are similar in their structure and design, which is described in connection with Figure 2. Both are supported by supporting means 32. A further feature of the apparatus of Figure 5 is that supporting means 32 rest upon slotted pebble flow control means 36. Means 36 is a platform-like or floor-like refractory member having a plurality of slots, which facilitate control of pebble flow, the slots being of such width as to permit flow of pebbles therethrough.

Figure 5A shows a cross-section of a hood 14 having catalyst trays 45.

The apparatus of Figure 6 is similar to that of Figure 5, except that disengaging means 14 are inclined at an angle corresponding to the angle of repose of the pebble bed, indicated by broken lines 37, thus providing uniform effective bed depth in the upper part of chamber 3 and, consequently, uniform contact time. Supports 32 are constructed as shown in Figures 2 and 3, and are of different heights, necessitated by the angular disposition of disengaging members 14. Quenching means 38 are positioned within disengaging means 14 and outlets 16 so that the product acetylene stream can be quenched immediately upon disengagement from the pebbles. Catalyst trays, not shown, can be placed within the disengaging members when it is desired to react the acetylene immediately after production. It is evident that the apparatus of Figure 5 is readily convertible to that of Figure 6, and vice versa.

The reaction chamber of this invention can be of any desired cross-sectional shape. A rectangular or a square cross-section is quite satisfactory.

*Example*

A feed gas consisting essentially of ethane is introduced into the lower portion of the lowermost reaction zone of a reactor illustrated by Figures 1 or 6. Pebbles are introduced into the upper portion of this zone at an average temperature of 1700° F., and the gaseous reactants pass upwardly countercurrent to the descending pebbles. Gas and pebble flow rates are adjusted so as to provide a residence time of 0.1 second and an average reaction temperature of 1550° F. The products are withdrawn from the upper portion of this reaction zone and passed directly into the top portion of the uppermost reaction zone. Pebbles are introduced into this reaction zone at an average temperature of 2300° F. Gas and pebble flow rates are correlated so that a reaction temperature of 2000° F. is attained with a residence time of 0.005 second. The products are quenched to a temperature below 1000° F. immediately on leaving the reactor, and are further cooled to 100° F. before being introduced into a separation and recovery system. Acetylene is recovered in good yield from the reaction products. Yields in the range 15 to 25 weight percent, based on ethane feed are obtainable.

The invention is not limited to the production of acetylene from ethane. Any fluid phase reaction requiring or utilizing a preliminary preheating or reaction step followed by a higher-temperature heating or reaction step can be carried out according to the invention. Some examples are: preheating of oxygen and/or hydrocarbon fuel followed by reaction to form carbon monoxide and hydrogen; preheating of oxygen and/or nitrogen, followed by reaction to form nitrogen oxides; and cracking of ethane or propane to form ethylene, followed by reaction of the ethylene with acetylene to form diolefins and aromatics.

Pebbles used as heat transfer medium can be of alundum, mullite, zirconia, or other refractory material and can contain catalytic ingredients.

Variation and modification are possible within the scope of the foregoing specification and the claims to this invention, the essence of which is that a fluid heating process comprising a preliminary heating step and a main heating step at a higher temperature is conducted by causing a mass of particulate heat-carrying solids to move through a reaction zone, countercurrently contacting fluid with said solids in one part of said zone, removing said fluid from said solids, and then noncountercurrently contacting said fluid with said solids in another part of said zone; and that there is provided, for such heating process, an apparatus comprising, in combination, a heating chamber, primary fluid introduction means in one part of said chamber, fluid disengaging means in an intermediate part of said chamber, secondary fluid introduction means in another part of said chamber, and means for passing particulate solids through said chamber.

I claim:

1. A process for conducting a two-stage reaction of a fluid which comprises moving a mass of heated refractory, particulate solids through a reaction zone; countercurrently contacting a fluid reactant with part of said mass in a lower portion of said zone to effect a first-stage reaction; disengaging first-stage reaction product from said mass in an intermediate portion of said zone; non-countercurrently contacting another part of said mass with said first-stage reaction product introduced into an upper portion of said zone above the level of solids therein so as to effect a second-stage reaction; and withdrawing a second-stage reaction product from said zone downstream with respect to solids flow from the locus of entry of said first-stage reaction product into said zone, said second-stage reaction being conducted at a higher temperature and a shorter reaction time than said first-stage reaction.

2. The process of claim 1 wherein an inert fluid is introduced into said reaction zone between the locus of withdrawal from said zone of said first-stage reaction product and the locus of withdrawal from said zone of said second-stage reaction product so as to provide a sealing zone therein.

3. A process which comprises causing a continuous bed of heated refractory pebbles to gravitate through a reaction zone; countercurrently contacting a hydrocarbon selected from the group consisting of ethane and propane with part of said pebbles in a lower portion of said zone at a temperature in the range of 1400 to 1700° F. and a reaction time in the range of 0.02 to 2 seconds; withdrawing ethylene from an intermediate portion of said bed; non-countercurrently contacting said ethylene with another part of said pebbles in an upper portion of said zone at a temperature in the range of 1800 to 2400° F. and a reaction time in the range of 0.001 to 0.02 second, said ethylene being introduced into said upper portion of said zone above the level of pebbles therein; and withdrawing acetylene as a product of the process from said zone downstream with respect to pebble flow from the locus of entry of said ethylene into said upper portion of said zone.

4. The process of claim 3 in which said reaction temperature and said reaction time in said lower part of said zone are in the ranges 1500 to 1700° F. and 0.05 to 1.0 second, respectively, and said reaction temperature and reaction time in said upper part of said zone are in the ranges 2000 to 2400° F. and 0.001 to 0.01 second respectively.

5. The process of claim 3 in which said acetylene is immediately quenched with a fluid reactable therewith to form an acetylene derivative.

6. A process which comprises passing a continuous mass of refractory pebbles downwardly through a pebble heating zone; countercurrently contacting said pebbles with air introduced into an upper part of said pebble heating zone; removing the resulting preheated air from said upper part of said pebble heating zone; passing said preheated air and fuel into a lower portion of said pebble heating zone; countercurrently contacting said preheated air and fuel under combustion conditions with said pebbles in a lower part of said pebble heating zone; withdrawing combustion products from said lower part of said pebble heating zone at a locus below that of entry of air to be preheated; withdrawing the resulting heated pebbles from said pebble heating zone and passing same into a reaction zone; gravitating said pebbles through said reaction zone as a continuous bed; countercurrently contacting a hydrocarbon selected from the group consisting of ethane and propane with part of said pebbles in a lower part of said reaction zone at a temperature in the range of 1400 to 1700° F. and a reaction time in the range of 0.02 to 2 seconds; withdrawing ethylene from said bed; non-countercurrently contacting said ethylene with another part of said pebbles in an upper part of said reaction zone at a temperature in the range of 1800 to 2400° F. and a reaction time in the range of 0.001 to 0.02 second; and withdrawing acetylene from said upper part of said reaction zone as a product of the process.

7. A process for conducting a two-stage reaction of a fluid which comprises moving a mass of heated refractory, particulate solids through a reaction zone; countercurrently contacting a fluid reactant with part of said mass in a lower portion of said zone to effect a first-stage reaction; disengaging first-stage reaction product from said mass in an intermediate portion of said zone; non-countercurrently contacting another part of said mass with said first-stage reaction product introduced into an upper portion of said zone above the level of solids therein so as to effect a second-stage reaction; and withdrawing a second-stage reaction product from said zone downstream with respect to solids flow from the locus of entry of said first-stage reaction product into said zone.

8. In a pebble heater apparatus, the improvement comprising, in combination, a vertically disposed heating chamber; a top closure member and a bottom closure member therefor; pebble inlet means positioned in said upper closure member and in open communication with said chamber; pebble outlet means positioned in said lower closure member and in open communication with said chamber; gas outlet means positioned in said upper closure member; first fluid introduction means positioned in the lower end of said chamber; second fluid introduction means positioned in an upper intermediate portion of said chamber; gas disengaging means positioned in a lower intermediate portion of said chamber between said first and second fluid introduction means; and conduit means connecting said gas outlet means with said first fluid introduction means.

9. Heating apparatus comprising, in combination, a vertical, refractory-lined container; gas inlet means positioned in a lower part of said container; gas disengaging means positioned in a lower intermediate part of said container; gas inlet means positioned in an upper intermediate part of said container; gas outlet means at the top of said container; conduit means in open communication with said gas outlet means and with said gas inlet means positioned in said lower part of said container; a vertical, gas heating chamber containing particulate solids formed in a bed therein positioned below said container and in open communication therewith through constricted throat means; pebble elevator means adapted to convey pebbles from the bottom of said chamber to the top of said container; gas inlet means positioned in the bottom of said gas heating chamber; gas-from-pebble disengaging means positioned in a lower intermediate part of said chamber; gas-from-pebble disengaging means positioned at an upper intermediate level in said chamber; gas inlet means positioned in an upper part of said gas heating chamber above the level of particulate solids therein; conduit means in open communication with the last-mentioned gas inlet means and with said disengaging means positioned at said lower intermediate level of said chamber; and outlet means in open communication with said disengaging means positioned at said upper intermediate level of said chamber.

10. In a pebble heater apparatus, a reaction chamber comprising, in combination: a vertical, refractory-lined chamber; a plurality of fluid conduit means at the top of said chamber and in open communication therewith; pebble conduit means at the top and at the bottom of said chamber and in open communication therewith: a plurality of horizontal, elongated, refractory gas collectors positioned convex upwardly in an intermediate part of said chamber; a plurality of fluid conduits in open communication with the interior of said gas collectors and with part of said plurality of fluid conduit means at the top of said chamber; said gas collectors being supported on a plurality of vertical refractory supports extending transversely of said chamber and resting on the bottom thereof; a plurality of openings in the lower part of said supports adapted to permit flow of particulate solids therethrough; fluid manifold means positioned in a lower part of said chamber; and a plurality of refractory deflector means positioned above said manifold means.

11. In a pebble heater apparatus, a reaction chamber comprising, in combination: a vertical, refractory-lined chamber; a plurality of fluid conduit means at the top of said chamber and in open communication therewith; pebble conduit means at the top and at the bottom of said chamber and in open communication therewith; a plurality of horizontal, elongated, refractory gas collectors positioned convex upwardly at two different intermediate levels in said chamber; the interior of said gas collectors at the lower of said levels being in open communication with said fluid conduit means at the top of said chamber through conduit means positioned outside said chamber; outlet means in communication with the interior of said gas collectors positioned at the upper of said levels; said gas collectors being supported on a plurality of vertical refractory supports; said supports resting upon a slotted refractory floor positioned in a lower part of said chamber and spaced above the bottom thereof; the slots in said floor being adapted to permit the passage of refractory pebbles therethrough; fluid manifold means positioned above said floor; and a plurality of refractory, fluid-deflector means positioned above said manifold means.

12. The apparatus of claim 11 in which catalyst trays are positioned within said gas collectors which are at the higher of said levels.

13. In a pebble heater apparatus, a reaction chamber comprising, in combination: a refractory-lined vertical chamber; a plurality of fluid conduit means at the top of said chamber and in open communication therewith; pebble conduit means at the top and at the bottom of said chamber and in open communication therewith; a plurality of elongated, refractory gas collectors positioned convex upwardly at an upper and at a lower intermediate level in said chamber; said gas collectors at said lower intermediate level being horizontally positioned and said gas collectors at said upper intermediate level being inclined; the horizontal gas collectors being in open communication with said fluid conduit means at the top of said chamber through conduit means positioned outside said chamber; outlet conduit means in open communication with the interior of the inclined gas collectors; said gas collectors being supported on a plurality of vertical refractory supports extending transversely in said chamber and resting on the bottom thereof; a plurality of openings in the lower part of said supports adapted to permit flow of particulate solids therethrough; fluid manifold means positioned in a lower part of said chamber; and a plurality of refractory deflector means positioned above said manifold means.

14. The apparatus of claim 13 in which quench conduit means are positioned within said gas collectors positioned at said upper intermediate level.

References Cited in the file of this patent
UNITED STATES PATENTS

| 2,437,222 | Crowley et al. | Mar. 2, 1948 |
| 2,439,730 | Happel | Apr. 13, 1948 |
| 2,448,257 | Evans | Aug. 31, 1948 |
| 2,543,743 | Evans | Feb. 27, 1951 |
| 2,554,435 | Weber | May 22, 1951 |
| 2,582,116 | Goins | Jan. 8, 1952 |
| 2,593,495 | Shimp | Apr. 22, 1952 |
| 2,623,842 | Robinson | Dec. 30, 1952 |
| 2,635,864 | Goins | Apr. 21, 1953 |
| 2,671,122 | Goldtrap | Mar. 2, 1954 |
| 2,692,294 | Boyer | Oct. 19, 1954 |